(12) United States Patent
Weaver

(10) Patent No.: US 10,088,091 B2
(45) Date of Patent: Oct. 2, 2018

(54) METHOD FOR CONTROLLING CREEP IN SPIRALLY EXPANDABLE PROFILE

(75) Inventor: Ron Weaver, Strathfield (AU)

(73) Assignee: Elegant Technical Solutions Pty Limited, New South Wales (AU)

( * ) Notice: Subject to any disclaimer, the term of this patent is extended or adjusted under 35 U.S.C. 154(b) by 0 days.

(21) Appl. No.: 14/237,247

(22) PCT Filed: Aug. 6, 2012

(86) PCT No.: PCT/AU2012/000920
§ 371 (c)(1),
(2), (4) Date: Feb. 5, 2014

(87) PCT Pub. No.: WO2013/020169
PCT Pub. Date: Feb. 14, 2013

(65) Prior Publication Data
US 2014/0190585 A1    Jul. 10, 2014

(30) Foreign Application Priority Data
Aug. 5, 2011  (AU) .................................. 2011903141

(51) Int. Cl.
*F16L 11/00* (2006.01)
*F16L 55/165* (2006.01)
(Continued)

(52) U.S. Cl.
CPC .......... *F16L 55/1655* (2013.01); *B29C 53/78* (2013.01); *B29C 63/32* (2013.01);
(Continued)

(58) Field of Classification Search
CPC ......... B29C 53/78; B29C 65/00; B29C 63/32; F16L 11/16; F16L 55/1655
(Continued)

(56) References Cited

U.S. PATENT DOCUMENTS 4,224,965 A * 9/1980 Suchor .................... F16L 11/16
138/122
4,471,813 A * 9/1984 Cothran ................. F16L 11/16
138/122

(Continued)

FOREIGN PATENT DOCUMENTS

JP          05-18478 A      1/1993
JP          06-143420 A     5/1994
(Continued)

OTHER PUBLICATIONS

International Preliminary Report on Patentability, dated Nov. 1, 2013, for Application No. PCT/AU2012/000920 (5 pages).
(Continued)

*Primary Examiner* — Charles P Cheyney
(74) *Attorney, Agent, or Firm* — Nutter McClennen & Fish LLP; John J. Penny, Jr.; Alex Nagorniy

(57) ABSTRACT

An elongated web or strip (200) comprising a wall portion bounded by edge portions and adapted to form a conduit by spirally winding said web and joining adjacent edge portions. The edge portions (210, 220) are adapted to permit relative movement between adjacent portions of the spiral conduit and thereby provide radial alteration of the conduit. The web includes a compensation portion (300) to alter the dimension of the web (200) upon radial alteration of the conduit and thereby compensate for creep in the spiral conduit. In a particularly preferred embodiment the edge portion comprises a primary lock (214, 224) and a secondary or sacrificial lock (212, 222). The sacrificial lock is disengaged by release of the mechanism 215 to permit relative movement there between and thereby effect radial alteration of the conduit.

5 Claims, 5 Drawing Sheets

(51) Int. Cl.
*B29C 63/32* (2006.01)
*B29C 53/78* (2006.01)
*F16L 9/16* (2006.01)
*F16L 11/16* (2006.01)

(52) U.S. Cl.
CPC .................. *F16L 9/16* (2013.01); *F16L 11/16* (2013.01); *Y10T 428/24777* (2015.01)

(58) Field of Classification Search
USPC .............................. 138/98, 97, 154, 129, 122
See application file for complete search history.

(56) References Cited

U.S. PATENT DOCUMENTS

| | | | | |
|---|---|---|---|---|
| 4,566,496 A | * | 1/1986 | Menzel | B29C 65/58 138/122 |
| 4,687,690 A | * | 8/1987 | Menzel | B21C 37/121 138/122 |
| 4,869,295 A | * | 9/1989 | Keldany | F16L 11/16 138/122 |
| 5,074,943 A | | 12/1991 | Menzel | |
| 5,101,863 A | * | 4/1992 | Fujii | F16L 55/1655 138/154 |
| 5,145,281 A | * | 9/1992 | Molyneux | E03F 3/06 405/146 |
| 7,975,728 B2 | * | 7/2011 | Melville | B29C 53/78 138/122 |
| 8,151,827 B2 | * | 4/2012 | Ohira | B29C 53/78 138/97 |
| 8,347,477 B2 | * | 1/2013 | Kakine | B29C 53/72 138/154 |
| 2015/0247593 A1 | * | 9/2015 | Weaver | B29C 63/32 138/129 |

FOREIGN PATENT DOCUMENTS

| | | |
|---|---|---|
| JP | 11-34165 A | 2/1999 |
| JP | 2000-254970 A | 9/2000 |
| JP | 2002-144426 A | 5/2002 |

OTHER PUBLICATIONS

International Search Report and Written Opinion, dated Oct. 15, 2012, for Application No. PCT/AU2012/000920 (9 pages).
European Office Action for Application No. 12821879.9, dated Dec. 20, 2017 (9 pages).

* cited by examiner

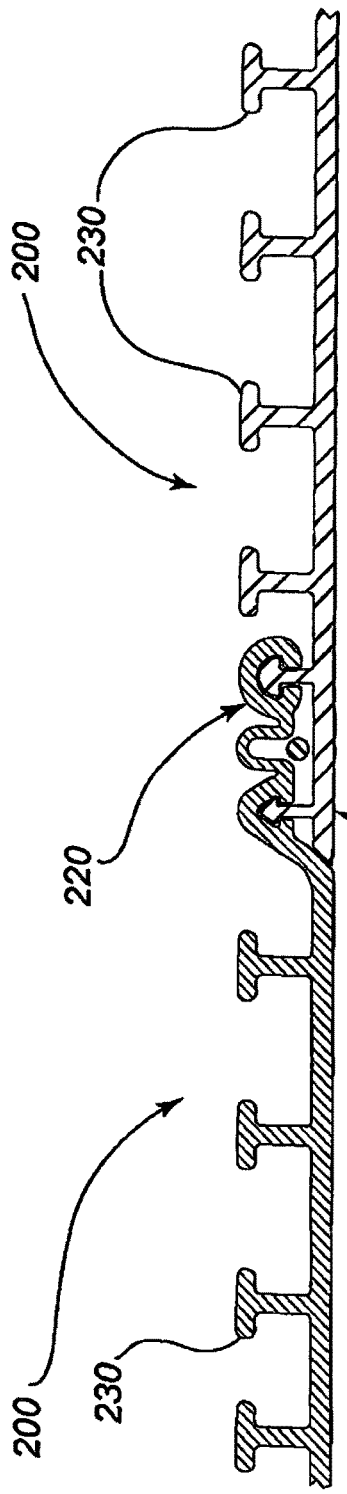
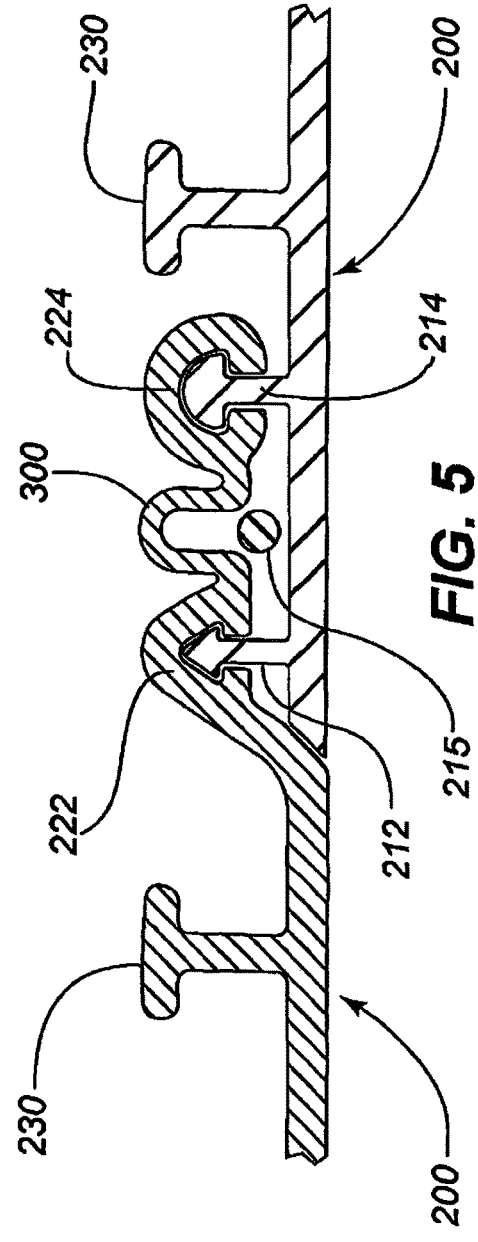

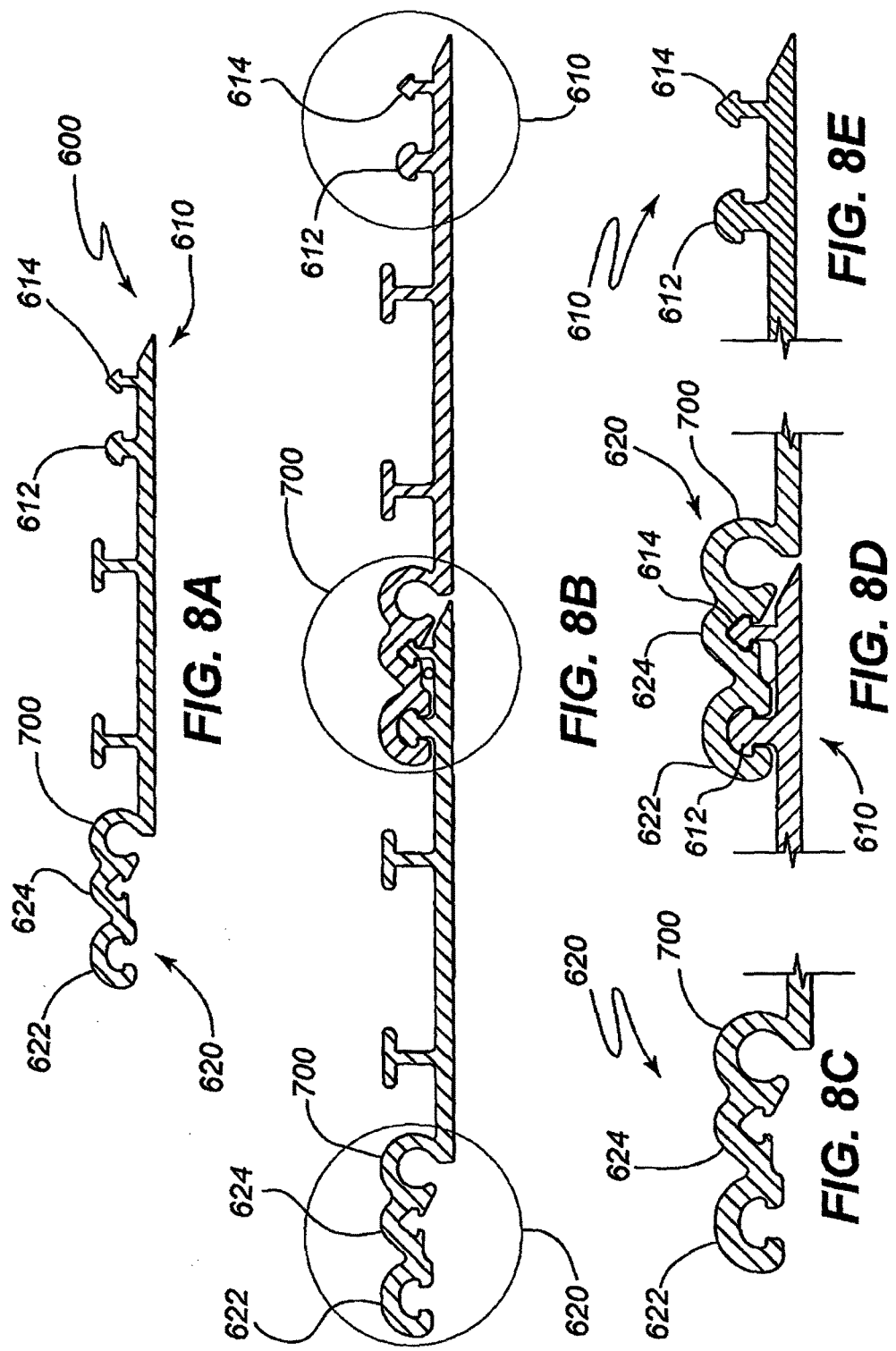

METHOD FOR CONTROLLING CREEP IN SPIRALLY EXPANDABLE PROFILE

TECHNICAL FIELD

The present invention relates to methods and apparatus for producing spirally wound pipes or pipe liners, webs or profiles for such pipes and liners and in particular methods and apparatus for compensating creep in such spirally wound pipes or liners.

BACKGROUND ART

Any discussion of the prior art throughout the specification should in no way be considered as an admission that such prior art is widely known or forms part of common general to knowledge in the field.

There are various well known and conventional methods for repairing pipes, in particular underground pipes. The most labour intensive is of course a complete replacement or repair of the pipe's concrete/cement lining.

In recent years, new mechanisms have developed for providing a plastic internal liner for the damaged pipe. This permits the damaged pipe to remain in place during and after repair, limits excavation and provides a rapid and relatively inexpensive repair.

One particular technique, and which is subject of several Australian and overseas patents, involves lining a damaged pipe with a helically wound pipe formed from a extruded plastic web (sometimes referred to as a "profile") with interlocking edges. In one such form, the pipe liner is installed as shown in FIG. 1. A winding machine 10 is lowered into the maintenance hole 20 and positioned at its base. A spool 40 of the profile 50 is provided at the surface. The profile 50 is fed to the winding machine 10 where it is helically wound into the pipe 30 in a reduced diameter form. Generally, to rehabilitate a wastewater main with an internal diameter of 150 mm, a liner with an external diameter of 130 mm is used. This allows the pipe to be installed with minimal friction from one maintenance hole to the next, typically a distance of 50 to 100 metres.

As the profile 50 is wound into the pipe 30, the edges of the profile 50 are interconnected to form the liner 60, but held such that relative movement between the adjacent edges of the respective profiles are prevented until the liner 60 can be expanded to its final position. To explain, the liner 60 is initially inserted into the pipe 30 in a tightly wound form to permit easy ingress of the liner 60 into the pipe 30. As the spool 40 of the profile 50 is unwound, the resultant liner 60 continues to progress along the pipe until it reaches the end of the pipe at the next maintenance hole. At this point the end of the liner 60 is held or fixed. The liner 60 is then expanded as discussed below such that its outer surface contacts the inner surface of the pipe 30, thereby lining and sealing the pipe 30.

In a currently available embodiment shown in FIG. 2, the adjacent edges of the respective profiles which produce the spirally wound liner are held together by locking members 70, 80. The locking members 70 and 80 are provided by ribs 71, 81 on one respective profile, and channels 72, 82 on the directly adjacent profile to accept ribs 71, 81 and thereby hold the wound profile in a spiral configuration. A wire 90 is positioned between the locking members. This wire is then removed from the liner 60 by pulling it radially inward through an opening 91 between the profiles to thereby sever one of the connecting members 70 (sometimes called a to "sacrificial lock") and permit relative movement between the adjacent profiles and expansion of the liner to the final increased diameter.

Preferably, the sacrificial lock 70 includes an adhesive to hold the liner, and primary lock 80 includes a lubricant to allow relative movement between the adjacent edges of the profile upon severing of the sacrificial lock 70.

A problem may arise, however, in that the longitudinal or axial length of the liner 60 will reduce as the diameter is increased. To explain, as shown in FIGS. 3A and 3B, upon release and radial expansion, the liner 60 will go from helix angle α to helix angle β upon expansion. This change in angle brings the profile closer to a right angle to the longitudinal axis. In turn this will necessarily reduce the length of the pipe from A to B. This reduction in length, sometimes referred to as "creep", may be of sufficient strength to force the winding machine 10 in direction 150 i.e. towards the pipe being repaired, potentially to contact the pipe or face 100 of the maintenance hole. If sufficient clearance is not allowed between the winding machine 10 and the face 100 of the maintenance hole 20, it is possible that this creep force 150 will cause the winding machine to come into contact with the wall of the maintenance hole and, since at this point further movement is not possible, the interlocking edges of the profile may separate and the liner 60 may fail. This will result in the liner 60 having to be completely removed from the pipe 30. Such a failed liner is of no further use, and cannot be re-installed.

An appropriate clearance between the winding machine 10 and the maintenance hole 20 is difficult to estimate and, usually, it is necessary to remove at least some of the concrete structure in the maintenance hole. This of course requires operator time in the initial installation but also to reinstate the maintenance hole after installation.

The occurrence of creep is quite a complex subject. For each pipe that is spirally wound, as mentioned above, a helix angle is created that is determined by the pitch of the interlocking edges of the profile, the diameter at which the pipe is wound, and the width of the profile used. As the diameter of the pipe is increased upon expansion, for the same profile width, the helix angle comes closer to an right angle to the axis of the pipe and effectively reduces the length of the pipe. During the expansion process, one end of the helically wound pipe liner is fixed and cannot move. The other end of the pipe is in the winding machine and is free to move within the clearance zone created during the initial setup. As the creep force is created during the expansion process, each section of profile needs to move to allow for the new helix angle. In effect, the entire section of the pipe contracts in length.

Another explanation is the small change in lock pitching. Referring again to FIG. 2, when the profile is initially wound, the position of locking member 70 sometimes referred to as a "sacrificial lock", determines the relative position of the engaging locks 70, 80. When the sacrificial lock 70 is disengaged by the wire 90, a new neutral position is created by the winding forces and the winding tension inside the pipe.

It is an object of the present invention to overcome or ameliorate at least one of the disadvantages of the prior art, or to provide a useful alternative.

It is an intention of at least the preferred embodiments of the present application to reduce and preferably eliminate aforementioned "creep" when installing spirally wound expanded pipes.

The term "creep" as used herein refers to force, either tension or compression primarily in the axial direction resulting from radial alteration, eg. expansion or contraction of a spirally wound pipe, pipe liner, or cover.

DESCRIPTION OF THE INVENTION

In a first aspect, the present invention provides an elongated web or strip comprising a wall portion bounded by edge portions and adapted to form a conduit by spirally winding said web and joining adjacent edge portions, said edge portions being adapted to permit relative movement of adjacent portions of said spiral conduit to thereby provide radial alteration of said conduit, said web further comprising a compensation portion to alter the dimensions of said web upon radial alteration of said conduit and thereby compensate for creep (as hereinbefore defined) in said spiral conduit.

In a second aspect a method of compensating for creep (as hereinbefore defined) in a conduit constructed from a spirally wound web, said method comprising providing said web with a compensation portion adapted to compensate for variation in length of said conduit liner resulting from expansion or contraction of the conduit liner diameter.

In a third aspect, a method of installing conduit comprising providing an elongated web or strip bounded by edge portions and adapted to form a conduit by spirally winding said web and joining adjacent edge portions, wherein said conduit is expanded or contracted to the desired diameter, said method comprising compensating for creep (as hereinbefore defined) during said expansion or contraction by providing said web with a compensation portion adapted to alter the dimensions of said web during and/or after said expansion/contraction.

The present invention also provides a conduit, pipe liner or pipe cover comprising the aforementioned elongated web or strip.

It will be clear to the skilled addressee, and from the description below, that the aforementioned method and apparatus to reduce creep, provides among other benefits, increased installation success rate, reduction in setup time to prepare a maintenance hole, reduce time to reinstate or repair a maintenance hole. It is also unnecessary to have highly skilled operators/installers since the aforementioned method and apparatus will not make it necessary for precise installation/clearance of the winding machine in the maintenance hole.

It should also be recognised that creep used throughout the specification refers to longitudinal forces applied by a spirally wound pipe or pipe liner either in compression or in tension.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

Embodiments of the present invention will now be described, by way of example only without limitation, with reference to the accompanying drawings in which:

FIG. 4 is a cross-sectional view or profile of the edge portion of adjacent webs connected in accordance with the present invention, FIG. 5 is a close up view of the connected edge portions of the web incorporating the present invention, FIGS. 8A-8E are various cross-sectional views of a further embodiment of a web according to the present invention.

BEST MODE(S) FOR CARRYING OUT THE INVENTION

Figure 1:
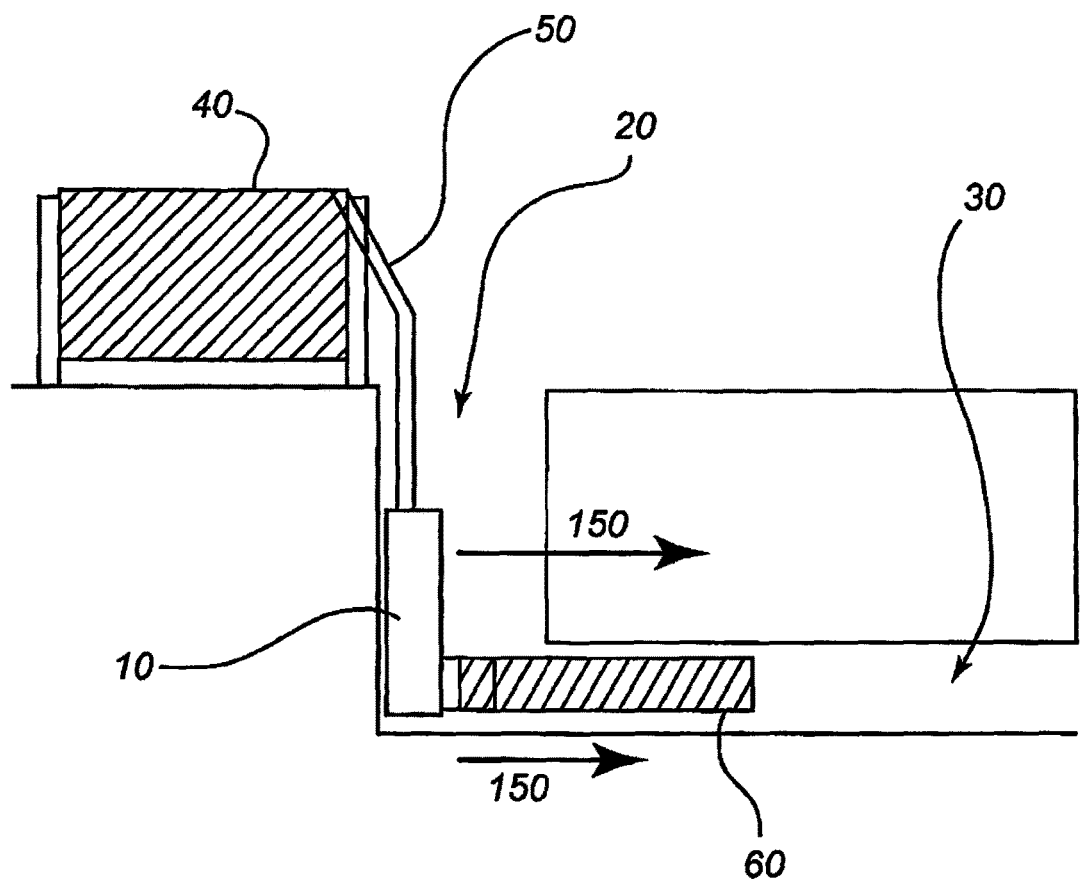
FIG. 1 is a diagrammatic view of a conventional installation system for spirally wound pipes.
Figure 2:
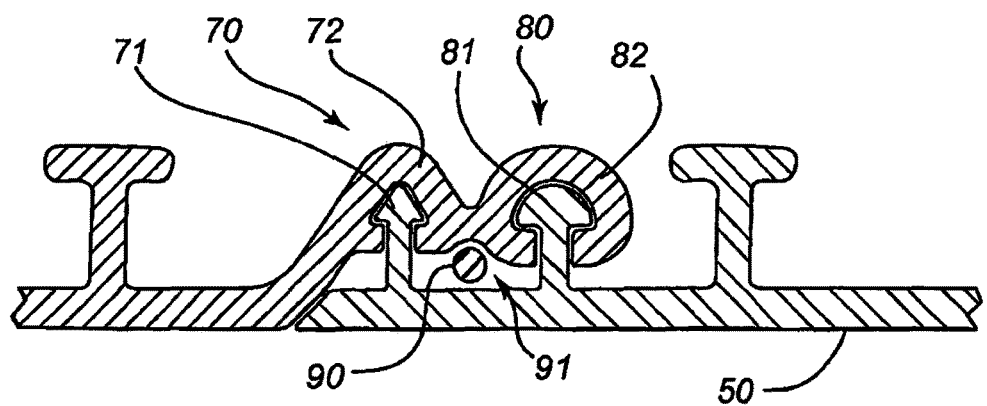
FIG. 2 is a close up view of a conventional connection system for connecting profiles or webs to form the spirally wound pipe.
Figure 3A:
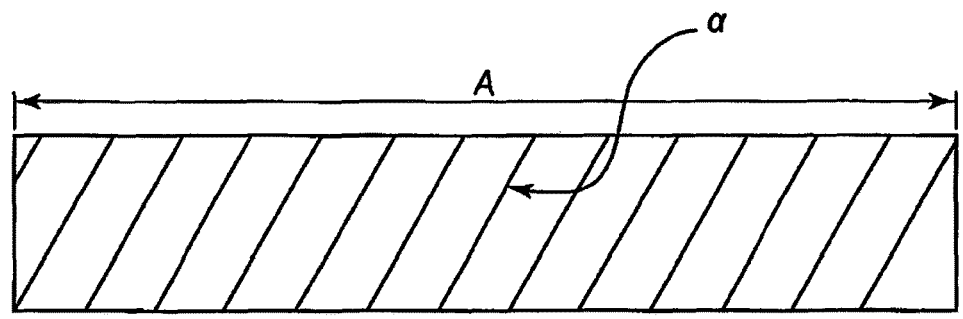
FIG. 3A and 3B are diagrammatic views of a spirally wound pipe or pipe liner/cover demonstrating the effect of "creep" when the pipe is expanded.
Figure 3B:
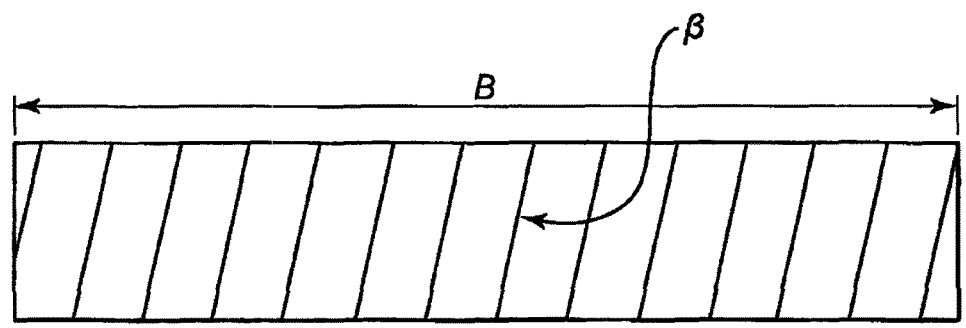

The present invention seeks to eliminate or at least reduce creep arising from installation of spirally wound pipes. In the embodiments shown, the pipe can be produced from any material such as PVC plastic or similar. In some instances metal, eg. stainless steel, can be used. It should be understood that the web or profile, and method according to the present invention can be produced from any material provided it is suitable to be spirally wound to form a pipe, pipe liner or cover.

Turning firstly to FIGS. 4 and 5, the present invention provides an elongated web 200 which is adapted to be spirally wound to form a pipe or pipe liner/cover. As will be clear to person skilled in the art, and as shown by the profiles in FIGS. 4 and 5, the web comprises a mutually engageable edge portions 210 and 220 on opposite side edges. In this embodiment, one engagement portion 210 provides two upstanding ribs 212, 214. The opposite edge portion 220 provides two mutually engageable recesses or channels 222, 224. As discussed above, and as well known in the art, a pipe or pipe liner/cover can be obtained by spirally winding said web such that adjacent edge portions 210, 220 of adjacent webs are connected. This continuing spiral of the web 200 then forms the aforementioned pipe or pipe liner/cover.

The web 200 shown in FIGS. 4 and 5 is intended to be used as a pipe liner. In the embodiment shown, the inner side of the web 200 is essentially smooth with the outer side comprising strengthening or spacer members 230. The strengthening or spacer members 230 may assist in sliding the pipe liner into the damaged pipe. The size and shape of these members, however, are based on the strength and spacing requirements of the pipe or pipe liner. If the profile 200 is being used as a pipe or pipe cover members 230 may be regarded as strengthening members. If, however, the web 200 is being used as a pipe liner, members 230 act as spacers to space the internal surface of the web 200 from the internal surface of the pipe being repaired. It will also be noticed that the aforementioned T-shaped spacers 230 may be sized to prevent any damage to the aforementioned engageable portions 210/220 or compensation portion 300 as they slide in the pipe.

It will be understood that the present invention is suitable for production of stand alone pipes, pipe liners and even pipe covers. In the case of pipes and pipe liners, creep may arise after radial expansion of the pipe as discussed above. Similarly, creep forces may occur if a pipe cover is formed and, for example, reduced in diameter from its original position so that is forms closely over a damaged pipe. The arrangement of the present invention and its ability to compensate for the aforementioned creep is applicable in both tension and compression.

Turning now to FIG. 5, a more detailed view of the web profile is shown illustrating how the adjacent edge portions of the web are engaged. In detail, engagement ribs 210 are provided as a primary locking member 214 and secondary or sacrificial locking member 212. A mentioned above, normally a wire or similar release member 215 is provided between the primary and sacrificial lock members. This wire or similar release member is removed from its position in between the locking members 212/214 thereby piercing or cutting sacrificial lock 212 and escaping through the spiral seam 250 where the webs 200 contact each other. Once such a wire is removed and sacrificial lock 212 is severed, the pipe liner, as is well known in the art, expands until spacer members 230 contact the inner surface of the pipe being repaired. This expansion brings the pipe liner to its final installed position. The expansion can occur immediately or in some cases progressively along the pipe liner. Expansion mechanisms may be provided internally of the pipe liner to assist in the expansion process.

As mentioned above, however, it is this radial expansion of the pipe liner which reduces the overall axial length thereby leading to "creep". In the embodiment shown, a compensation portion or expansion loop 300 is provided on web 200. When sacrificial lock member 212 is then cut and then radial expansion begins, the compensation portion or expansion loop 300 similarly expands or in this case lengthens in the longitudinal or axial direction to assist in compensating for the longitudinal change in length. While the aforementioned compensation portion/expansion loop 300 does not seem particularly large, it must be remember that this expansion loop 300 will spiral around the length of the pipe 200 mimicking the path of the web 200 itself. It is expected that each such compensation portion 300 would expand by 0.5 to 1.0 mm however greater or small distances are within the scope of the invention. The overall effect of such compensation portion/expansion loop is quite significant.

If desired, the compensation portion 300 can be produced in any format, configuration or material desired. The compensation portion can be formed integrally with the web 200 as shown in FIGS. 4 and 5, it can be an additional portion attached to the web 200 or can indeed be an additional component, e.g. intermediate web, as shown below in FIG. 7. The compensation portion can be co-extruded with the web or attached, e.g. by laser welding etc. In the embodiment shown, the compensation portion acts to compensate primarily in the longitudinally axial direction. It could be envisaged that the compensation portion may also act in the circumferential or radial direction to assist in reduction or elimination of creep resulting from radial expansion or contraction of the pipe liner as discussed above.

In the embodiment shown in FIGS. 4 and 5 the compensation portion/expansion loop 300 is only engaged when radial expansion of the pipe liner 200 takes place. In other words, when the wire 215 severs sacrificial lock 212 and radial expansion of the pipe liner 200 begins, it is only then that the compensation portion/expansion loop 300 is activated. If the wire 215 is not removed, such that the distance between co-operating engagement channels 222 and 224 remains the same, the compensation portion/expansion loop 300 would remain in its relaxed state. In other words, the aforementioned compensation portion/expansion loop 300 in no way affects installation or use of the pipe liner 300. It is only activated upon radial expansion of the pipe liner which in turn causes the aforementioned "creep".

Turning to FIGS. 6A-6D various other embodiments of a compensation portion can be seen. In each of the web profiles shown in FIGS. 6A to 6B, the compensation portion is provided between the adjacent edge portions of the web rather than at the adjacent edge portions as shown in FIGS. 4 and 5.

Figure 6A:
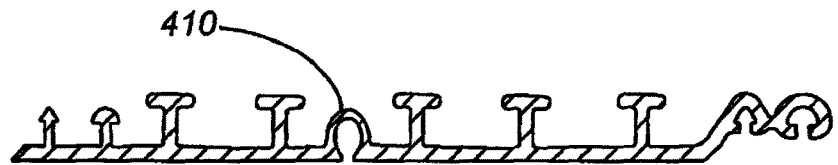
FIGS. 6A-6D are profiles of various embodiments of a web according to the present invention.
Figure 6B:
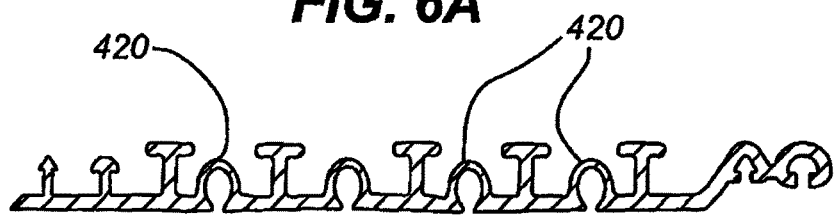
Figure 6C:
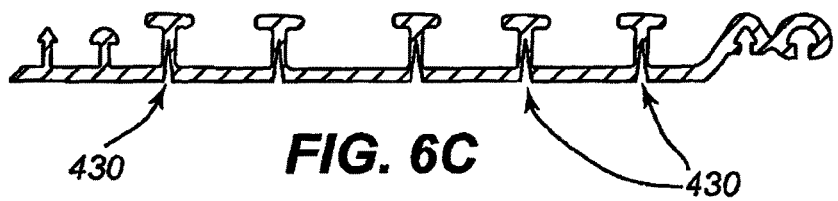

FIG. 6A provides a single expansion loop 410 approximately midway between the adjacent edge portions of the web as the compensation portion. FIG. 6B provides multiple expansion loops 420 along the web inbetween the aforementioned spacer members. FIG. 6C provides an alternative embodiment in which the strengthening/spacer members themselves are bifurcated to form opening 430 which compensates for the longitudinal force being applied a result of the aforementioned "creep" in the pipe liner.

Figure 6D:
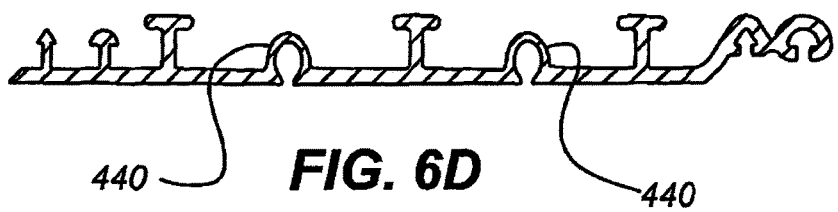

FIG. 6D provides yet a further embodiment in which some of the spacer/reinforcing members are replaced with loop members 440.

The embodiment shown in FIGS. 4 and 5 is preferred for a number of reasons over the embodiments shown in 6A-6D. Firstly, the embodiment shown in FIGS. 4 and 5 is not activated until desired. Further, the interior smooth surface of the pipe liner remains smooth. It will be seen in FIGS. 6A-6D that the internal side of the web 200, and as a result the internal face of the pipe liner, has a series of gaps or channels formed therein by the compensation portion or expansion loop. It should be stressed, however, that in each of the embodiments shown, the web is designed to compensate for any creep arising from radial expansion or contraction of the spiral pipes/pipe liner.

Preferably, the inventive arrangement provides a compensation portion which is configured under load to provide substantial identical alteration of the dimensions of the web around the circumference of the conduit. To explain, some conventional web profiles have flexible portions adapted to provide flexibility to the resultant spirally wound pipe so that the pipe may be fed through bends. The present inventive arrangement, however, preferably provides a compensation portion adapted to provide substantially identical alteration of the dimensions of the web. In other words, unlike a flexible spirally wound pipe where one side would be in compression and the other side in tension as it forms a bend, the present inventive method and apparatus provide consistent, substantial identical extension (or in some cases compression) across or around the circumference of the conduit. In this fashion, the web profile and method provided by the present invention is clearly and significantly different from conventional systems.

Figure 7:
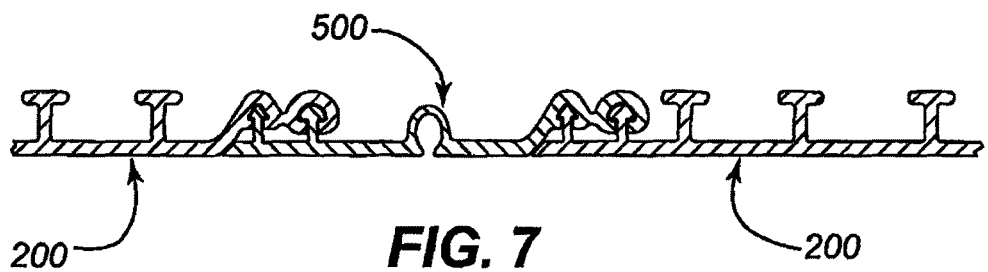
FIG. 7 is a cross-sectional or profile view of a series of connected webs in accordance with yet a further embodiment of the present invention.

Still a further embodiment is provided in FIG. 7. In this embodiment, an intermediate web 500 is provided. As seen in profile, the web 500 has edged portions identical to the primary web 200 such that it can be positioned intermediate the flutes of the primary web 200 and still form a spirally wound pipe/pipe liner in a conventional fashion. However, the intermediate web 500 comprises a compensation portion similar to the aforementioned embodiments in FIGS. 4, 5 and 6A-6D to reduce creep resulting from radial expansion or contraction of the resultant spirally wound pipe/pipe liner.

It should be recognised here that this embodiment is particularly useful as it can be designed to suit a conventional spiral web or profile. This permits conventional web or profile to be used in conjunction with the present invention. In other words it does not render current stock obsolete.

Rather it provides a mechanism for modifying the conventional profile/web while still compensating or alleviating creep.

It should also be mentioned that in the embodiments shown, the relevant compensation portions/expansion loop can be constructed from the same material as the web or from a flexible compressable material. This is particularly true for the embodiment shown in FIG. 7. Indeed the intermediate web 500 could be entirely constructed from a resilient material with the remaining conventional web 200 being produced from conventional substantially rigid material.

FIGS. 8A-E show various aspects of another particularly preferred embodiment of the present invention. The profile is shown as a separate element or web in FIG. 8A and connected to adjacent profiles, in FIG. 8B.

In much the same way as the embodiments shown in FIGS. 4 and 5, the web 600 has mutually engageable edge portion 610 and 620 on opposite side edges. One engagement portion 610 has upstanding rib 612 and 614. The opposite edge portion 620 has mutually engageable recesses or channels 622 and 624. As shown more clearly in FIGS. 8B and 8D upstanding ribs to 612 and 614 engage with and are held, at least initially, by the respective recesses or channels 622 and 624.

In this instance, the compensation portion 700 is provided directly adjacent the mutually engaged edge portions. As discussed above, these mutually engaged portions provided a primary lock 622/612 and a secondary or sacrificial lock 624/614. In this particularly preferred embodiment the compensation portion 700 is provided directly adjacent these locks and in particular the sacrificial lock rather than in between them as shown in FIGS. 4 and 5. This has a number of advantages in particular the compensation portion 700 does not cause interruption of fluid flow and, like the embodiments of FIGS. 4 and 5, maintains a substantially smooth inner surface of the pipe wall.

Use of the aforementioned webs of profiles would be similar to conventional installation techniques. The web would be fed to a winding machine and passed into the pipe to be repaired. In line with conventional mechanisms, the primary and sacrificial locks are engaged. The sacrificial lock may contain an adhesive to hold the pipe to be wound at a fixed diameter. During the installation process, the wire in inserted between the primary and sacrificial locks. A lubricant may be provided in the primary lock to permit relative movement between adjacent edges of the profiles.

After full installation of the pipe liner at the aforementioned reduced diameter, the wire is gradually used to sever to sacrificial lock so that the pipe liner expansion process can begin. This process occurs as more profile is feed into the winding machine causing the diameter in the section where the lock is severed to increase. The end of the pipe remote from the machine is expanded first to the size of damaged pipe diameter. This continues along the pipe until finally reaching the winding machine. During this expansion process, the compensation portion within the web stretches slightly to absorb the creep force and allow the winding machine to remain with the same position thereby reducing the possibility of contact of the winding machine in the maintenance hole and damage to the machine, hole or the spirally wound pipe liner The present invention is a significant advance over conventional spirally wound pipes and pipe liners. It not only provides a more robust and reliable pipe/lining system, installation is eased, there being no need to determine clearances or in any other fashion taking into account the potential difficulties associated with creep.

The person skilled in the art will understand that the inventive method and apparatus may be embodied in forms other than that specifically described herein without departing from the spirit or scope of the present invention.

The claims defining the invention are as follows:

1. An elongated web or strip comprising a wall portion bounded by edge portions and adapted to form a conduit by spirally winding said web and joining adjacent edge portions, said edge portions including a primary locking formation and a secondary/sacrificial locking formation, wherein, upon a release member severing said secondary/sacrificial locking formation, relative movement of adjacent edge portions of said spiral conduit is permitted to thereby provide radial expansion of said conduit, said web further comprising a compensation portion to alter the dimensions of said web upon radial expansion of said conduit and thereby compensate for creep arising from radial expansion of said spiral conduit, said compensation portion being located, intermediate said primary and secondary/sacrificial looking formation such that, apart from the joint between adjacent webs, the interior surface of the web is substantially smooth and free of dislocations; wherein said release member is located intermediate said primary and secondary locking formations when both locking formations are engaged.

2. A web or strip as claimed in claim 1 wherein said web is configured such that upon application of creep, said compensation portion provides substantially identical alteration of the dimensions of said web around the circumference of said conduit.

3. A web or strip as claimed in claim 1 wherein said compensation portion alters the width of said web upon radial alteration of said conduit.

4. A web or strip as claimed in claim 1 wherein said compensation portion is provided by a resilient material formed in said web.

5. A web or strip as claimed in claim 1 wherein said compensation portion is provided by a compressible formation in said web.

* * * * *